C. M. B. BOOS.
SILO AND METHOD OF CONSTRUCTING THE SAME.
APPLICATION FILED FEB. 25, 1918.
1,438,090.
Patented Dec. 5, 1922.
5 SHEETS—SHEET 3.
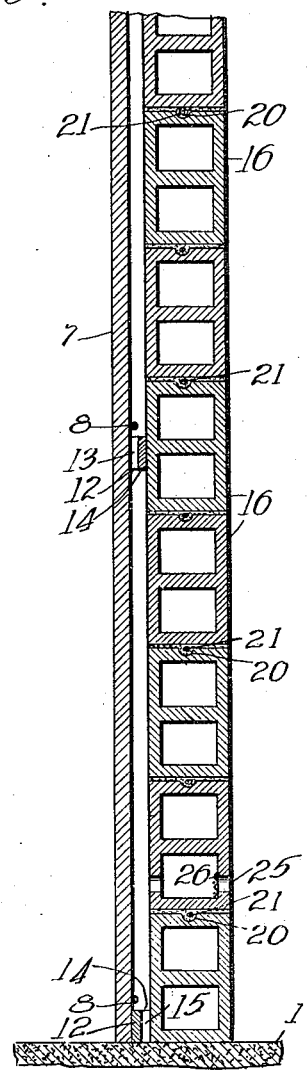
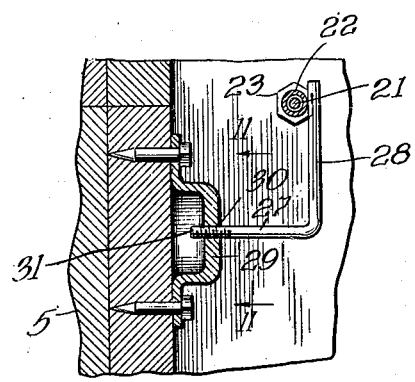
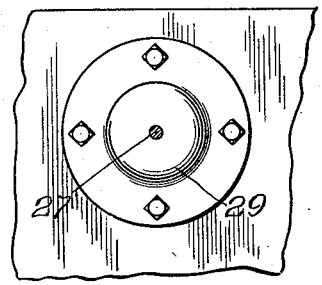
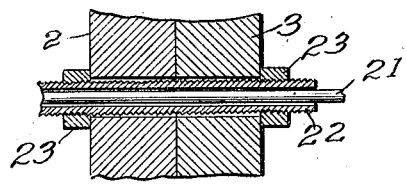

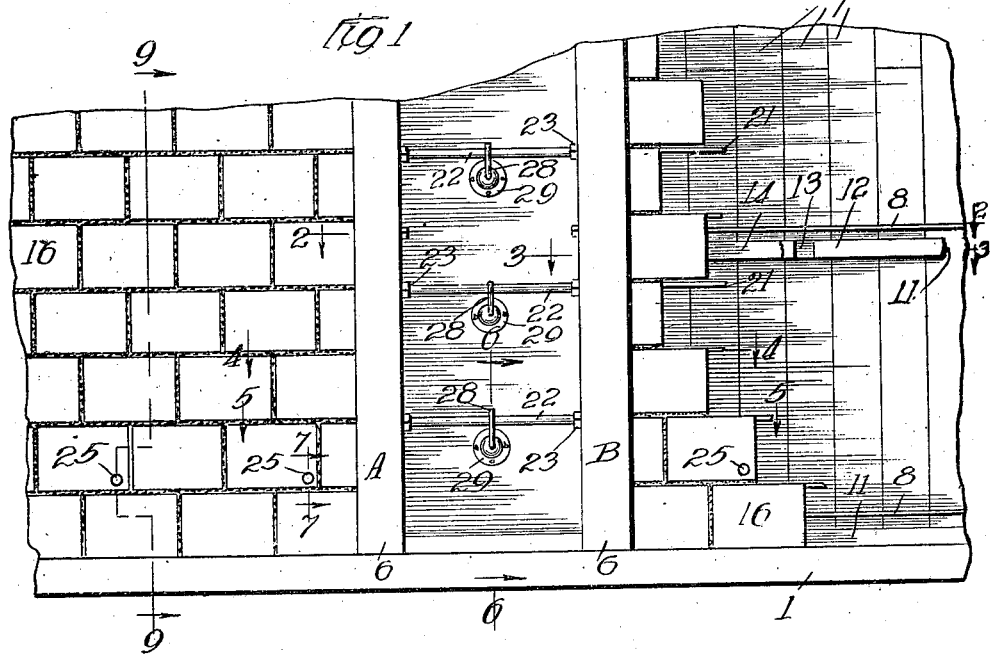
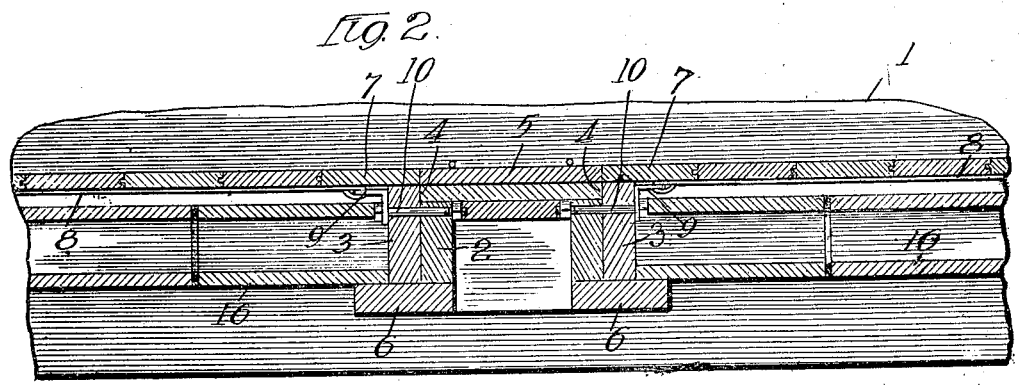
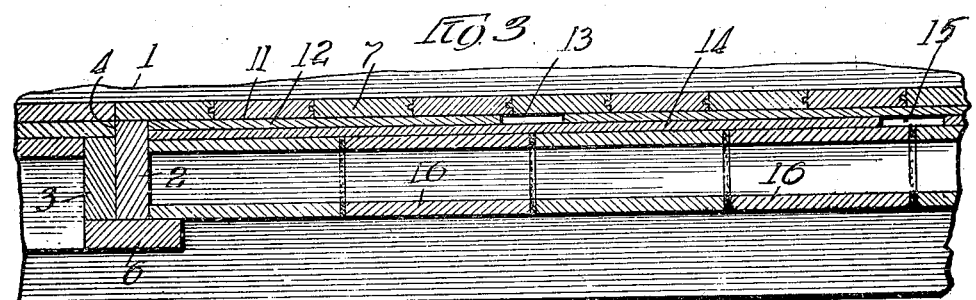

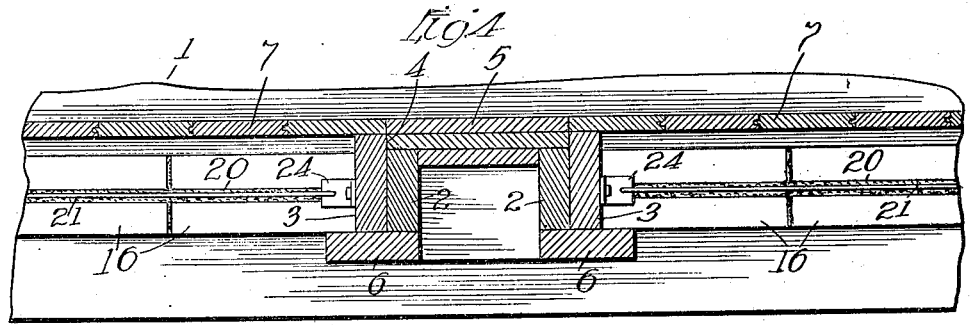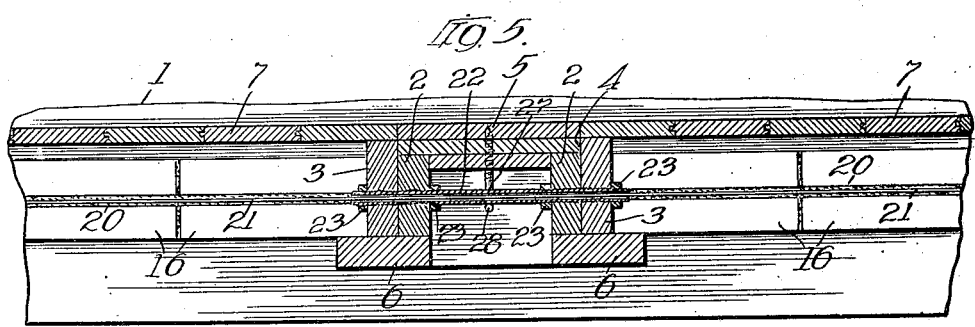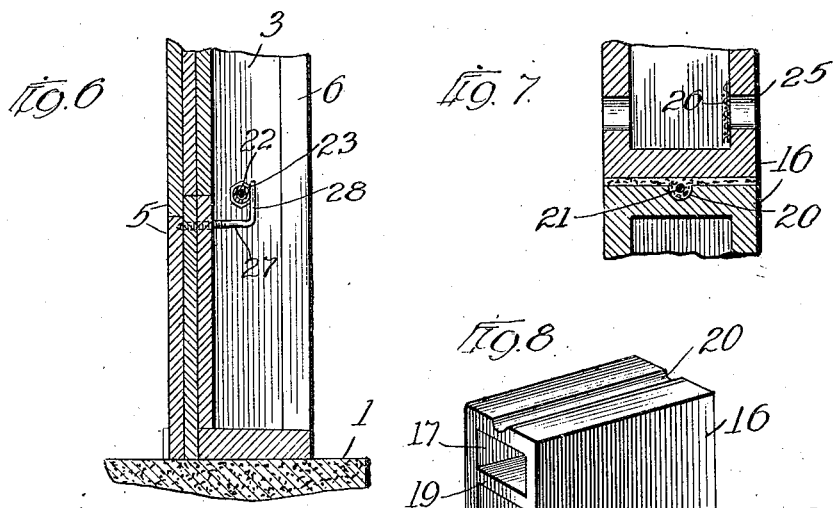

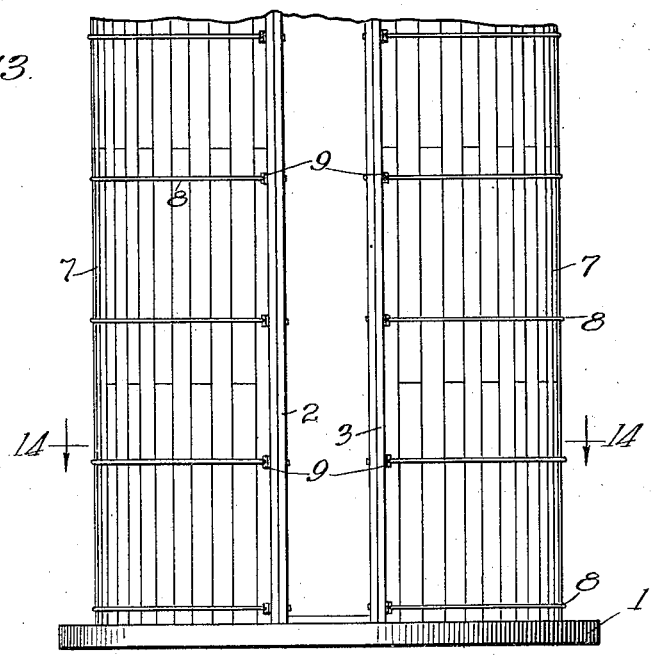
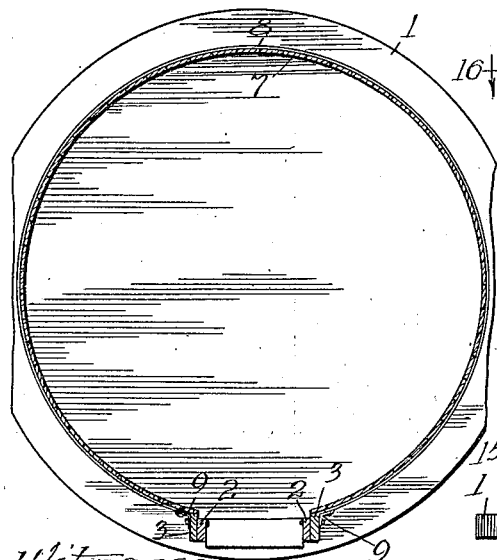
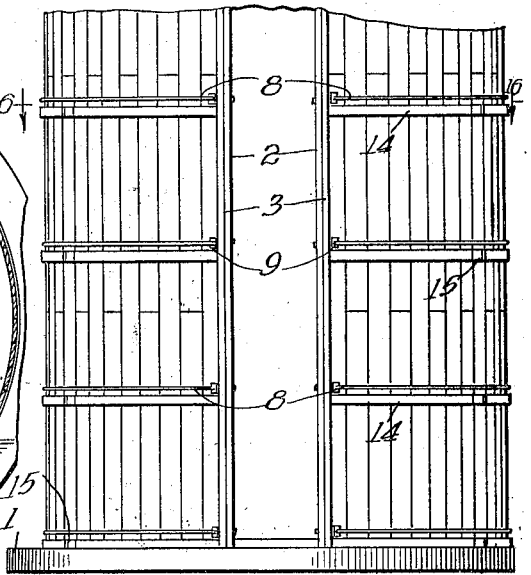

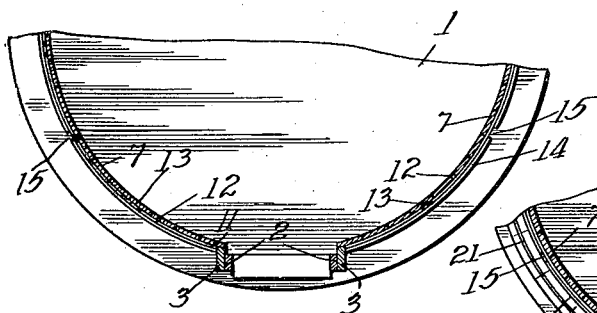
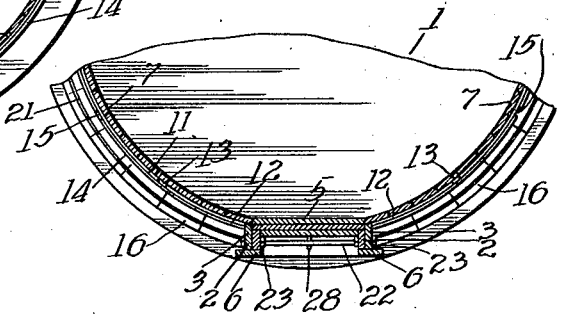
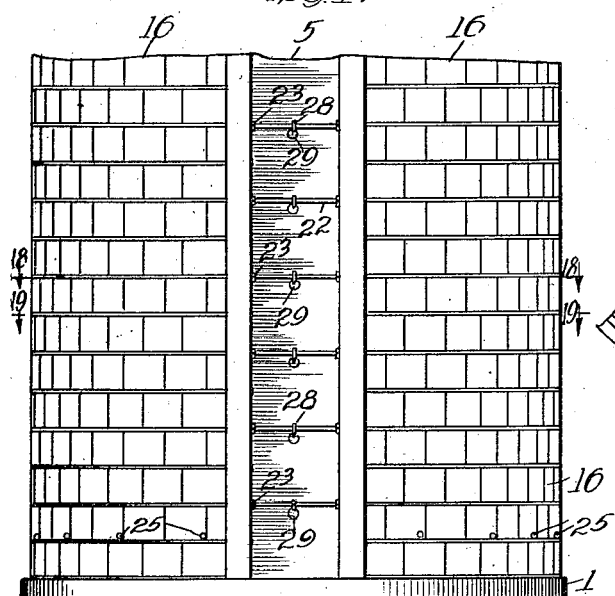
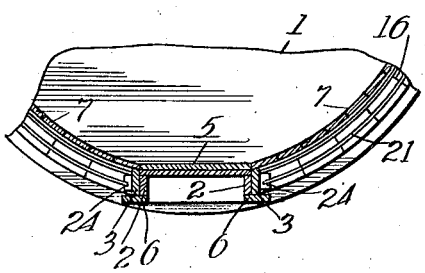

Patented Dec. 5, 1922.

1,438,090

UNITED STATES PATENT OFFICE.

CASPER M. B. BOOS, OF CHICAGO, ILLINOIS, ASSIGNOR, BY MESNE ASSIGNMENTS, TO NO-FREZ SILO CO., OF ELGIN, ILLINOIS, A CORPORATION OF ILLINOIS.

SILO AND METHOD OF CONSTRUCTING THE SAME.

Application filed February 25, 1918. Serial No. 219,075.

*To all whom it may concern:*

Be it known that I, CASPER M. B. BOOS, a citizen of the United States, residing in Chicago, Cook County, Illinois, have invented a new and useful Improvement in Silos and Methods of Constructing the Same, of which the following is a specification.

This invention relates to silos, and more particularly to such as are adapted to give perfect ventilation between the inner and outer walls, and are of such construction as to prevent an excess loss of heat from the contents herein.

As is well known, wood is the more desirable material for the construction of silos in so far as regards the question of the preservation of the ensilage. However, wood presents many difficulties in the construction of silos, such as expansion and contraction which necessitates the tightening or loosening of the surrounding hoops at different seasons of the year; also its susceptibility to deterioration from exposure to the weather; and its instability necessitating cumbersome and obstructing means for bracing the same against wind pressures and the like.

Concrete and other masonry walls on the other hand possess great stability and permanence, as far as the mere question of durability is concerned, but is far less desirable as a material for silo construction for the reason that the loss of ensilage in concrete silos is approximately twenty percent greater than that in wood silos. This is caused by the fact that a much greater transfer of heat takes place through concrete or other masonry walls than in walls built of wood. As is well known, the contents of the silo should undergo fermentation with an accompanying temperature of from 150 to 154 degrees Fahrenheit. The maintenance of this temperature cannot be secured at points in close proximity with the walls when such walls permit too great transfer of heat therethrough. It is a known fact that the ensilage in silos having purely masonry walls will, in cold weather, freeze to a depth of from sixteen to eighteen inches inwardly from the outer edges. Such frozen part represents pure loss when removing the ensilage for feeding. It is thus seen that wood, since it is to a great extent a non-conductor of heat, is the much more desirable material for the construction of silos, but as pointed out above it possesses many objections for use in this regard.

I have overcome the above objections and difficulties in this invention by constructing a wall composed partly of masonry, and partly of wood, the latter forming the inner surface of the silo with which the ensilage will come in contact, and thus securing in a silo both the desired permanency and strength, as well as the elimination of the loss of ensilage resulting from walls built entirely of masonry construction. In other words, as will be clearly seen in the following specification, I combine the good qualities of both masonry and wood in silo construction.

Among the objects of my invention is to effect in silo construction the combination of the maximum of strength and permanency with the greatest efficiency of preservation of ensilage; further to produce a silo having a masonry outer wall and a wood inner wall; further to render possible and provide means to produce perfect ventilation between the outer and inner walls; further to arrange the members forming the inner wall in staggered relation and securely hold them in proper position independently of the outer wall; further to provide novel means for drawing taut the tightening means for the inner wall; further to provide a novel form of door frame construction which can be fitted together to receive the doors in perfect fitting relation, and securing the parts of such frame to prevent subsequent disarrangement in this respect; further to provide a novel form of door construction and lock means therefor; further to provide novel means for spacing the inner wall from the outer wall and permitting perfect ventilation through the space between such walls; further to produce a more compact, economical, efficient and durable silo; and such further objects, advantages and capabilities as will later more fully appear.

My invention further resides in the combination, construction and arrangement of parts illustrated in the accompanying drawings, and while I have shown therein a preferred embodiment, I desire to be understood that the same is susceptible of modification and change without departing from the spirit of my invention.

Referring to the drawings—

Figure 1 is a fragmentary side elevation of a portion of the bottom of my silo showing part of the exterior wall removed.

Figure 2 is a fragmentary, horizontal, transverse sectional view taken on the line 2—2 of Figure 1.

Figure 3 is a section taken on the line 3—3 of Figure 1.

Figure 4 is a section taken on the line 4—4 of Figure 1.

Figure 5 is a section taken on the line 5—5 of Figure 1.

Figure 6 is a fragmentary sectional view of a portion of the bottom of the silo taken on the vertical line 6—6 of Figure 1.

Figure 7 is a fragmentary, sectional view of two superposed blocks and taken on the line 7—7 of Figure 1.

Figure 8 is a perspective view of one of the concrete blocks of the outer wall.

Figure 9 is a transverse, vertical sectional view on the line 9—9 of Figure 1.

Figure 10 is a fragmentary, transverse, vertical sectional view through a portion of one of the doors and frame showing my improved locking means.

Figure 11 is a section taken on the line 11—11 of Figure 10.

Figure 12 is a fragmentary, vertical sectional view taken through one end of the sleeve shown in Figure 5.

Figure 13 is a fragmentary elevation of the lower portion of my silo, and shows the same during the early stages of construction.

Figure 14 is a transverse, horizontal sectional view taken on the line before 14—14 of Figure 13.

Figure 15 is a view similar to Figure 13, but shows the lathing fixed in place.

Figure 16 is a fragmentary, transverse, horizontal section on the line 16—16 of Figure 15.

Figure 17 is an elevation of the lower portion of the silo in its completed form.

Figure 18 is a fragmentary section taken on the line 18—18 of Figure 17.

Figure 19 is a fragmentary section on the line 19—19 of Figure 17.

In the drawings, and referring to Figures 1–5, 1 designates a suitable foundation constructed of concrete or other desirable material and has erected thereupon in suitable spaced relation the upright door frame members designated generally at A and B in Figure 1. As seen in Figure 2, the door frames comprise the parallel members 2 and 3, the member 2 of which is of slightly less width than member 3, in order to provide the shoulders 4 against which fit the inner edges of the door members 5, as seen clearly in Figures 2, 4 and 5. At the forward edges of the members 2 and 3 are located the face members 6, the inner edges of which are flushed with the inner faces of the members 2.

Secured by nailing, bolting or the like to each of the members 3 are the first of the upright members 7 of the inner wall, and which upright members define the limits of the door opening on the inner face of the silo. Continuing from the members 7, so as to form a circular wall, are other similar members which preferably are boards of any desired thickness and suitably tongued and grooved along their edges. Surrounding this inner circular wooden wall are the spaced apart metal hoops 8, which at each end are secured to the angle plates 9, (see Fig. 2), which angle plates are in turn bolted to the members 2 and 3 by means of bolts 10. As will be explained later, these bolts also serve as means for tightening the hoops 8, and which hoops will be spaced suitable distances apart throughout the height of the silo.

Below the hoops 8, and secured by nailing or the like to the inner wall are the bands 11, which bands are composed of two layers of lath, as seen in Figure 3. The inner layer 12 of these bands is first nailed around the circumference of the inner wall with the ends of the laths arranged in spaced apart relation, as shown at 13. Secured upon the outer face of the first layer of laths is the second layer of laths 14, the ends of the individual laths of which overlap the laths of the first layer a distance of approximately one-half their length, and the ends of this outer layer of laths are also arranged in spaced apart relation whereby to provide the spaces 15 therebetween. This arrangement of laths is such as to provide around the circumference of the silo the two series of openings 13 and 15, the purpose of which will later appear.

The outer wall of the silo comprises the hollow concrete blocks 16, shown in perspective in Figure 8, wherein it is seen that these blocks are provided with two longitudinally extending hollow spaces 17 and 18, separated by the rib 19. In the upper face of the block, and extending longitudinally thereof, is the groove 20, which grooves when the blocks are laid in courses in the wall fall in alinement with each other and are adapted to receive the hoops 21 when they are embedded in the cement between the blocks, as shown in Figure 7. These hoops function in an obvious manner to reinforce the wall upon the hardening of the cement between the blocks.

Referring to Figure 5, it will be seen that as a means for securing the upright sides of the door frame rigidly in spaced relation, I have provided sleeves 22 threaded upon each end for a substantial distance, and providaround the wall, a second layer is added over the first layer and so arranged that the ends of the laths therein are spaced apart and in staggered relation with the ends of those in the first layer. The outer layer of concrete blocks is then built up to a height even with the top of the five foot boards mentioned above, and arranged with its inner face contacting the outer face of the outer layer of laths 14. During the construction of the outer concrete wall suitable hoops, as described above, are laid in the cement between the blocks, some of which hoops are secured to the angular plates 24 shown in Figure 4, while every alternate hoop which is of slightly larger diameter is extended through the sleeves 22, as shown in Figure 5. After the first section of both inner and outer walls has been completed to a five foot height, the second section is then started and proceeded with in a similar manner. These steps are continued until the top of the silo is reached, in which top are formed suitable perforations to complete the circulation from the inner air spaces between the walls to the top of the silo and out through the ordinary flue or cupola provided for this purpose, but not shown. As pointed out above, the ventilation is complete at the bottom of the wall through the medium of the openings 25. The ventilation between the spaces above and below the bands of lath is effected through the spaces between the ends of the laths.

It will thus be seen that I have provided a silo possessing both the durability and permanence of masonry walls, and also the preservative value of wood walls, and have so arranged ventilation between the outer and inner wall as to result in the substantially perfect preservation, fermentation and seasoning of the contents by maintaining the necessary temperature at all points within the silo.

Having thus described my invention, I claim:

1. In a silo an inner wall formed of wood and having binding hoops therearound, laths longitudinally secured around the circumference of said inner wall, an outer wall, and means in said laths to permit ventilation thereabove and therebelow.

2. In a silo an inner wall formed of wood, flat bands of substantial thickness encircling said wall, an outer wall in contact with said bands whereby to produce enclosed spaces above and below said bands, means to hold the boards of the inner wall under compression, and means for providing ventilation between said spaces and to the exterior of the silo, comprising apertures through said bands.

3. In a silo an inner wall formed of wood, a band encircling said wall and comprising a double layer of laths arranged in longitudinally staggered relation, an outer wall in contact with said band, said laths being arranged with their ends spaced apart whereby to provide ventilating spaces.

4. In a silo an inner wall formed of wood, spaced bands encircling said wall, each band comprising a double layer of laths arranged in longitudinally staggered relation, an outer wall of hollow concrete blocks in contact with the outer face of said bands, the ends of said laths being spaced apart whereby to provide ventilation for the spaces between said outer and inner walls, and openings in said outer wall to complete the ventilation with the exterior.

5. In a silo spaced vertical door frame members, spaced sleeves connecting said frame members, means on said sleeves for holding said members rigidly spaced apart, a masonry wall abutting the outer sides of said frame members, hoops extending longitudinally through said wall each alternate hoop being secured at its ends to the respective frame members and every other alternate hoop passing through one of said sleeves.

6. In a silo a door, a plate adapted to be secured to said door, said plate having a threaded aperture therein, a locking hook threaded in said aperture and adapted to engage at its outer end a cross bar, whereby upon rotation said hook may be made to grip said bar either more tightly or more loosely according to the direction of rotation.

7. In a silo, door locking means comprising a plate adapted to be secured to a door, said plate having a threaded aperture therein, a hook having threads at one end and an angular projection at the other, said threads adapted to engage said threaded aperture and said projection to engage a cross bar, whereby the grip of said projection on said bar may be increased or diminished as said hook is rotated in the appropriate direction.

8. In a silo, vertical spaced apart door frame members, threaded sleeves passing through said members, and nuts on the sleeves arranged in pairs at each end whereby to firmly grip said members any desired distance apart, said sleeves serving as passages to carry reinforcing wires across the door frames and protect them from mechanical injury.

9. In a silo, spaced apart vertical door frame members, a threaded sleeve passing through said frame members, nuts on the sleeve for clamping said frame members rigidly in spaced relation, a wall, a hoop extending around said wall, said hoop extending longitudinally through said sleeve, whereby the same is protected from mechanical injury.

10. In a silo a wall, a door frame, a bar ed on such threaded portion with the nuts 23, between which nuts may be clamped the respective side members 2 and 3 of the door frame, which, as is clearly seen, will rigidly lock these members any desired predetermined distance apart. This distance, as will be clearly understood, will be such as to accommodate the doors 5. Referring to Figure 1, it will be seen that these sleeves 22 are arranged in such position as to fall in alinement with every alternate, horizontal joint between the concrete blocks. The rods 21 in such alternate joints, as will be seen in Figure 5, extend through the sleeves 22 and are suitably twisted together or otherwise secured at any desired point in the circumference of the wall. These wires 21, which pass through the sleeves 22, are of somewhat larger diameter than the wires in the other alternate courses, which latter wires instead of passing across the space between the door frame members, are attached at their ends to the rectangular plates 24, which plates are bolted to the upright door frame members, as is clearly seen in Figure 4.

This construction of outer and inner walls results in the formation of air spaces therebetween, which are in communication with each other by virtue of the passages 13 and 15 formed between the ends of the laths 12 and 14 respectively. In order to provide for the circulation of air through the spaces between the two walls, the blocks of the second course from the bottom are provided with openings 25 at suitable distances around the circumference of the wall, and over the inside of which openings are arranged screens 26, to prevent the entry of foreign substances into the hollow blocks and air spaces between the two walls. For convenience the drawings have only shown the lower portion of the silo, but it will be understood that the circulation of air through the air spaces between the two walls will be completed at the top of the silo by providing openings through the top member of the silo in any desired manner.

Referring now to the door construction, it will be seen in Figure 6, that the doors are formed of sections comprising a plurality of layers, one or more of the layers projecting beyond the other layers at the ends of the door sections, as shown, whereby to interlock the ends of the sections when in position. In order to lock the door sections in closed position, I have provided the hooks 27, which hooks may be screwed directly into the wood of the door sections to such a distance as to bring the projecting angular end 28, when turned into appropriate position, into engagement with one of the sleeves 22. In Figure 10 I have illustrated in detail a more substantial form of this locking arrangement which comprises securing to the door section the suitable dome shaped metal plate 29, provided at its center with a threaded aperture 30, in which threaded aperture engages the threaded end 31 of the hook 27, the outer end of which hook is bent at an angle as shown at 28. By this arrangement the angular end 28 may, by turning into an appropriate position, be brought into engagement with the sleeve 22, and this engagement may be tightened or decreased by further rotation of the hook 27 in the appropriate direction. For example, if the position shown in Figure 10 is not considered sufficiently tight an additional rotation of the hook 27 will bring the end 28 into tighter engagement with the sleeve 22. Sometimes it may not be necessary to give a complete revolution to the hook 27, but a partial revolution such as to still leave the arm 28 in engagement with the sleeve 22 may be sufficient to give the desired tightness of grip between these parts.

Turning now to the method of constructing this silo, and referring to Figures 13 to 19, the first step involves forming a suitable foundation 1 of concrete or other material. The upright members of the door frame are then arranged in proper relation to each other upon the ground and rigidly secured the required distance apart by proper adjustment of the nuts 23 upon the sleeves 22. When this adjustment is such as to correctly receive the door sections in position the frame members are raised in proper position on foundation 1. The first members 7 of the inner circular wall are then attached to the members 3 of the frame, after which the remaining boards of the inner wall are arranged in a circle by the aid of an inner circular form (not shown), after which the hoops 8 are stretched therearound and secured at their ends to the angular plates 9 (see Fig. 2). The angular plates 9, which at this point are a suitable distance removed from the sides of the door frame members, are then brought tightly against the sides of the door frame by tightening the bolts 10, after which the surplus ends projecting on the inside are sheared off. It is here pointed out that when you arrange the boards of the inner wall in position they are arranged in 5 and 10 foot lengths, alternately placed, that is so a five foot length always follows a ten foot length, whereby when the second and next higher section of the wall is built, the abutting ends of the boards will be in staggered relation, as clearly shown in Figure 13.

After the hoops 8 are tightened by drawing the angle plates 9 against the sides of the door frame, spaced rows or bands of lath are then tacked around the outer face of the wall, and arranged with their ends in spaced relation as described above. After the first layer of laths has been completed extending across said frame, a door section, and a hook having a screw-threaded portion secured to said door whereby upon rotation said hook will engage said bar and said engagement may be made more tight upon further rotation of said hook.

11. In a silo an outer wall of hollow concrete blocks, cement between said blocks, hoops embedded in said cement, a door frame, part of said hoops being secured to said frame and part passing therethrough, an inner wall spaced from said outer wall by bands formed of a double layer of overlapping laths, the ends of said laths being spaced apart to provide ventilation therethrough, and openings in said concrete blocks to complete the ventilation with the outside.

12. In a silo, vertical door frame members, means for holding said members rigidly spaced apart, an upright wall member secured to each of said frame members, a circular wall connecting said upright members, and a hoop external to and encircling said wall and capable when shortened of drawing the wall members together, an angle plate on one side of each of said frame members, said angle plate being capable of moving toward said frame members in a direction longitudinally of the hoops to cause tightening thereof, the ends of said hoops being secured to said angle plates respectively, and bolts passing through said angle plates and said frame members whereby upon tightening said bolts the hoops will be drawn taut after which the surplus end of the bolts may be cut off.

13. The method of constructing silos which comprises erecting a section of a circular wall, and drawing hoops tightly therearound, attaching laths around the circumference of said section with their ends spaced apart, attaching other similarly spaced apart laths to said first mentioned laths and in staggered relation thereto, and erecting a section of an outer wall to contact the outer face of said last mentioned laths and repeating the steps to the desired height.

14. The method of constructing silos which comprises erecting a section of a circular wall composed of boards of different lengths, with their ends in staggered relation, securing laths around the circumference thereof with their ends spaced apart, erecting a section of an outer wall to contact said laths and of a height equal to that of the shorter vertical members of the already erected section, extending the inner wall upwardly, using boards of substantially the same length and periodically building the outer wall up to the lowest height of the inner wall.

15. The method of constructing silos which comprises erecting and securing in spaced relation vertical door frame members, erecting in connection therewith a section of a circular wall, placing hoops around said wall and drawing them taut by bolts mounted in said frame members, applying to said wall spaced apart bands formed of overlapping laths arranged with their ends spaced apart, erecting an outer wall in contact with said bands and having holes therethrough adjacent the bottom, and repeating the steps to the desired height, except that the holes through the outer wall are omitted intermediate its end portions.

16. The method of constructing silos which comprises erecting vertical door frame members on a previously constructed foundation, erecting a wall section composed of half-length and full-length members alternately placed, drawing hoops tightly around said wall section, applying to the exterior of said section spaced apart bands composed of overlapping laths with their ends spaced apart, erecting a masonry wall outside of said bands and in contact therewith, and adding to the height of the walls until the desired height is reached, using full-length members for the inner wall until the final course is reached, the ends of the members of each section abutting the ends of the members of the preceeding section.

17. The method of constructing silos which comprises erecting a door frame and an inner wall section formed of wood, providing sleeves across said frame, applying to the exterior of said wall bands of superposed, staggered laths spaced apart at their ends, erecting an outer wall of hollow concrete blocks, said outer wall contacting the bands, reinforcing said outer wall during erection with hoops embedded in cement, and extending part of said hoops through said sleeves, and securing the remainder of said hoops to the sides of said frame.

18. The method of constructing silos which comprises assembling the door frame members and rigidly securing them in spaced relation so that the door sections will nicely fit therebetween, securing an inner wall member to the door frame upon each side thereof, erecting the first course of an inner circular wall of wood and securing the same in position with hoops, securing to the outer face of said wall laths with their ends spaced apart, applying over said laths a second layer of laths with their ends spaced apart, and finally erecting an outer concrete wall spaced from the inner wall a distance equal to the thickness of the two layers of laths.

In witness whereof, I hereunto subscribe my name to this specification in the presence of two witnesses.

CASPER M. B. BOOS.

Witnesses:
W. E. SHRADER,
M. T. DONOVAN.